(12) United States Patent
Prochnow

(10) Patent No.: US 11,414,056 B2
(45) Date of Patent: Aug. 16, 2022

(54) VEHICLE DEVICE AND METHOD

(71) Applicant: Douglas Lawton Prochnow, Olathe, KS (US)

(72) Inventor: Douglas Lawton Prochnow, Olathe, KS (US)

( * ) Notice: Subject to any disclaimer, the term of this patent is extended or adjusted under 35 U.S.C. 154(b) by 287 days.

(21) Appl. No.: 16/854,223

(22) Filed: Apr. 21, 2020

(65) Prior Publication Data
US 2020/0406868 A1  Dec. 31, 2020

Related U.S. Application Data

(60) Provisional application No. 62/921,309, filed on Jun. 10, 2019.

(51) Int. Cl.
*B60S 11/00* (2006.01)
*B60P 3/32* (2006.01)

(52) U.S. Cl.
CPC ............. *B60S 11/00* (2013.01); *B60P 3/32* (2013.01)

(58) Field of Classification Search
CPC .... B60S 11/00; B60S 9/00; B60S 9/04; B60S 9/22
See application file for complete search history.

(56) References Cited

U.S. PATENT DOCUMENTS

| | | | |
|---|---|---|---|
| 6,698,738 B2 * | 3/2004 | Wiebe | B25B 5/006 269/75 |
| 7,290,760 B1 * | 11/2007 | Lindsay | B25B 1/22 269/75 |
| 10,471,768 B1 * | 11/2019 | Lindsay | B25B 1/2457 |
| 2020/0406868 A1 * | 12/2020 | Prochnow | B60S 11/00 |

* cited by examiner

*Primary Examiner* — Lee D Wilson
(74) *Attorney, Agent, or Firm* — Arthur K. Shaffer; McDowell Rice Smith & Buchanan PC

(57) ABSTRACT

The present invention provides a vehicle leveling device with an upper arcuate support presenting a substantially planar surface and a lower support with an arcuate groove configured for rotational receipt of the upper arcuate support opposite the substantially planar surface, a rotational axis aligned with the arcuate groove and extending between a front and a rear associated with the upper arcuate support and parallel to the substantially planar surface; the upper arcuate support configured for rotation about the rotational axis.

7 Claims, 8 Drawing Sheets

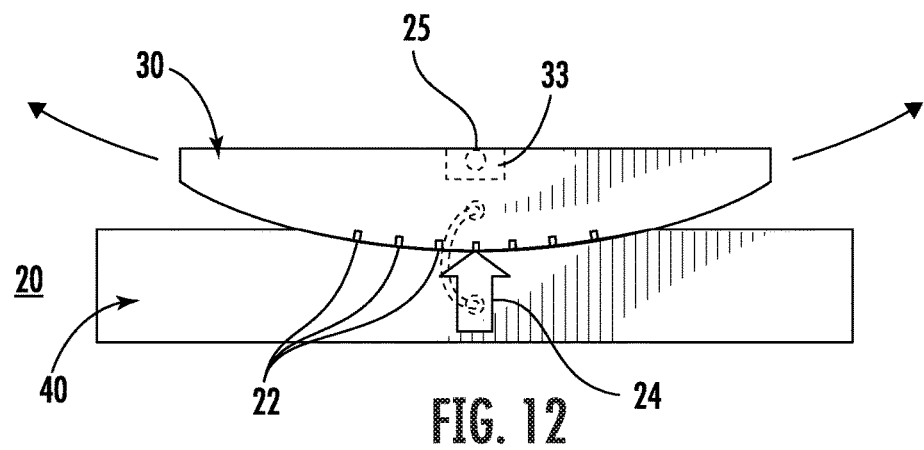
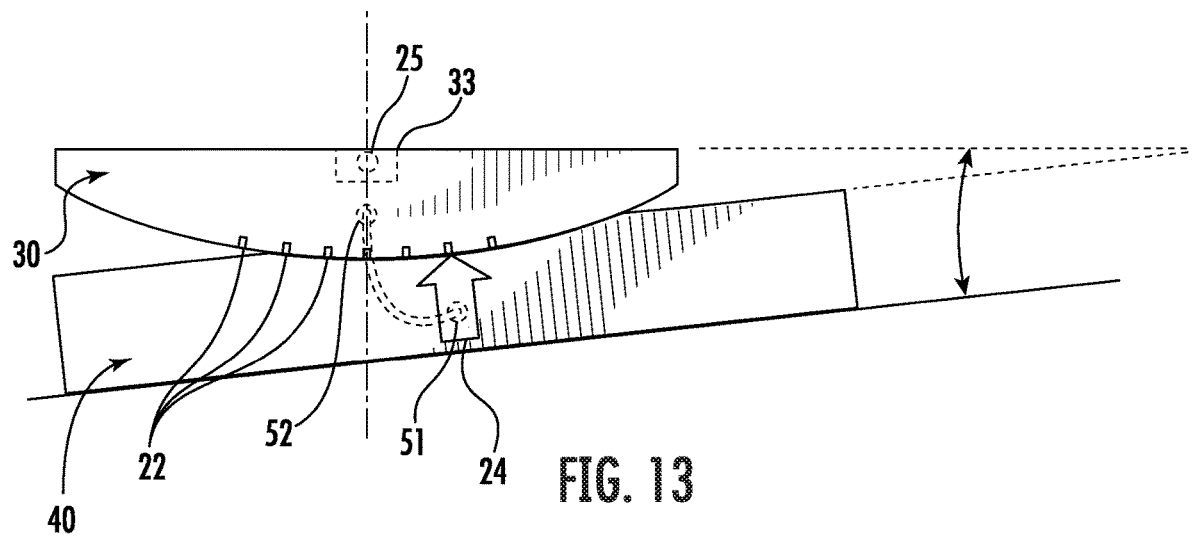

VEHICLE DEVICE AND METHOD

CROSS-REFERENCE TO RELATED APPLICATION

The present application claims the benefit of the prior filed U.S. provisional application filed on Jun. 10, 2019, Ser. No. 62/921,309 which the substance of which is incorporated herein.

FIELD OF THE INVENTION

The present invention is broadly directed to a leveling device and method for providing a level surface and more particular to a two-piece device which can be used for leveling a trailer and method for adjusting the device for use to provide a level surface for leveling a vehicle or trailer.

BACKGROUND OF THE INVENTION

Demand for various types of RVs has been increasing in recent years. Motorized camping has steadily increased in popularity in recent years due to an increased popularity and mobility of recreational type vehicles along with a variety of features which can convert the recreational vehicle of yesteryear to a luxurious ride with a large assortment of features and the conveniences of modern life. In addition, the motorhome lifestyle has been increasing in popularity as an increased generation of younger workers are retiring and becoming interested in motorized travel around the country. The utilization of recreational vehicles also known as "motor homes" and "camper trailers" has correspondingly increased. Such recreational vehicles are often utilized for short stays at campgrounds and other areas where the vehicles are parked. Some of the features of these various motor homes include kitchen facilities and living areas which must be leveled when parked for use.

("RVs") are often parked or rested for short stays at campgrounds and the like, and must be parked on ground surfaces which are often irregular and not uniform, flat or level. In addition, if RVs are parked on uneven surfaces, they may "vibrate" as a result of undesired movement. In addition, the movement can damage, bend or break the provided jacks or various jack components including the contained seals. As a result, it is desirable, and commonly necessary, for the vehicles to be leveled. Leveling the RV however, involves leveling various jacks or vertical support structures individually as the ground contour, on which the vehicle is parked, varies. This often involves leveling each jack independent of the others and has presented a problem for RV users.

Various approaches to vehicle leveling have been attempted and are known in the prior art, but none of the approaches have successfully provided a simple, inexpensive, lightweight, and low maintenance device and method of use to efficiently accomplish the task of leveling both single and multi-axle RVs. Leveling devices are known in the prior art and several approaches disclose the use of automatic leveling systems, typically hydraulically or pneumatically actuated. Other leveling devices include adjustable height or thickness components which are vertically adjustable with a substantially rectangular or planar structure. Some of these approaches suffer the disadvantages of lack of sufficient adjustability, initial high cost, mechanical complexity, heavy weight, and constant maintenance. Accordingly, such systems are typically available only on high cost RVs, making them effectively unavailable to the majority of RV users.

Another approach utilizes manually operated jacks to raise the RV, but that approach has its own disadvantages. Those disadvantages include difficulty of operation, reduction of vehicle stability, unnecessary weight, and maintenance requirements. In another approach, rigid wedges or blocks are placed in front of or behind the wheel(s) on the side of the RV to be raised and the RV is driven onto the wedges or blocks. Some designs provide depressions in the upper surface of the wedges to receive a portion of a tire to help stabilize the RV without the need for wheel chocks. The use of such rigid blocks presents its own further set of disadvantages, including difficulty of storage and, especially with tandem or multi-axle RVs, the inability to place a wedge of sufficient length between the tires to be elevated and the inability to evenly distribute the load between or among the axles.

There remains an unfilled need for a simple, inexpensive, and low maintenance flexible leveling device capable of providing an effective means of readily leveling an RV with single or multiple axles, while addressing and overcoming at least some of the disadvantages associated with devices known in the prior art.

SUMMARY OF THE INVENTION

The foregoing needs are met, to a great extend, by the present invention, wherein a self leveling device and method are provided which includes a vehicle leveling device comprising an upper arcuate support presenting a substantially planar surface; a lower support presenting an arcuate groove and configured for rotational receipt of said upper arcuate support; said upper arcuate support presenting an arcuate surface opposite said substantially planar surface; a rotational axis aligned with said arcuate groove and extending between a front and a rear associated with said upper arcuate support and parallel to said substantially planar surface; and said upper arcuate support configured for rotation about said rotational axis.

In one embodiment, the vehicle leveling device includes a first support structure, a second rotateable support structure and presenting a self-leveling planar surface for use in supporting a recreational vehicle.

In one embodiment, the vehicle leveling device comprises an upper arcuate support presenting a substantially planar surface, rotatable from a neutral orientation to a horizontal orientation; a lower support presenting an arcuate groove and configured for rotational receipt of said upper arcuate support; said upper arcuate support presenting an arcuate surface opposite said substantially planar surface and rotational about said arcuate groove and an angle of correction extending from said upper arcuate support when rotated about said arcuate groove.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described preferred embodiments of the present invention.

BRIEF DESCRIPTION OF THE DRAWINGS

FIG. 12 is a front elevation of the self-leveling device in accordance with the embodiment illustrated in FIG. 2 with the arcuate support rotateable from left to right.

FIG. 13 is a front elevation of the self-leveling device in accordance with the embodiment illustrated in FIG. 2 with an angle of correction.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
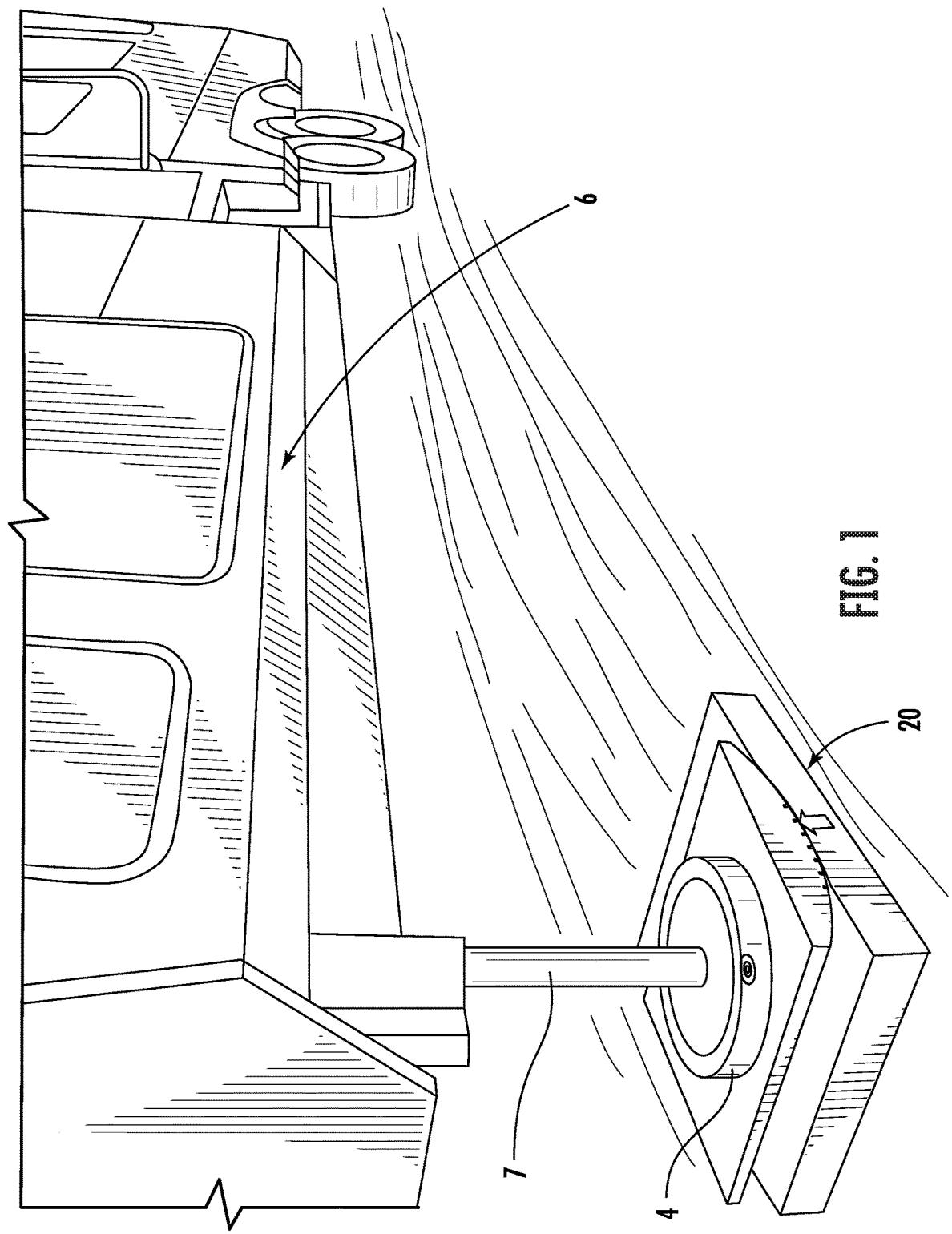
FIG. 1 is a perspective view of an environmental illustration of the self-leveling device in accordance with an embodiment of the present invention.

Referring to the drawings in more detail, an embodiment of the present device a vehicle leveling device generally designated by the reference number 20, is illustrated in FIG. 1 with an upper arcuate support 30 supported by a lower support 40. The upper arcuate support 30 generally provides the function of leveling the supported load and the lower support 40 generally provides the function of supporting the load while allowing for leveling of the upper arcuate support 30. The upper arcuate support 30 also provides the function of measuring and displaying the level status.

The upper arcuate support 30 include an upper substantially planar surface 32 separated from a lower arcuate surface 34 by a first side 36 and a second side 37. The embodiment of the upper arcuate support 30 illustrated in FIGS. 1-4, 8-11 is depicted as a cylindrical segment which is rotateable about an axis of rotation 38 which generally extends parallel to the substantially planar surface 32 between a plane extending from a front surface 35a and a plane extending from a rear surface 35b.

Figure 2:
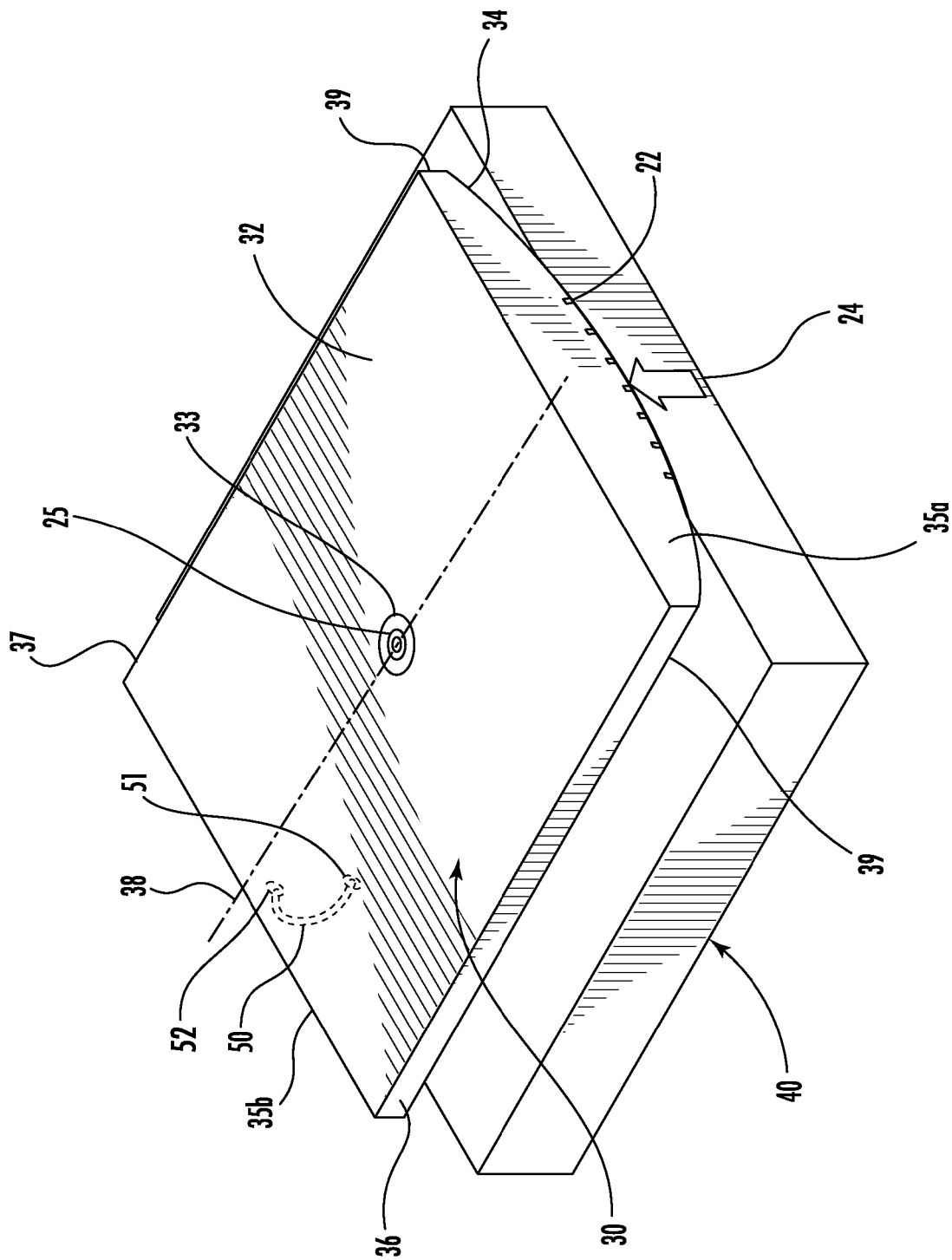
FIG. 2 is a front perspective view of the embodiment of the self-leveling device in accordance with FIG. 1.
Figure 3:
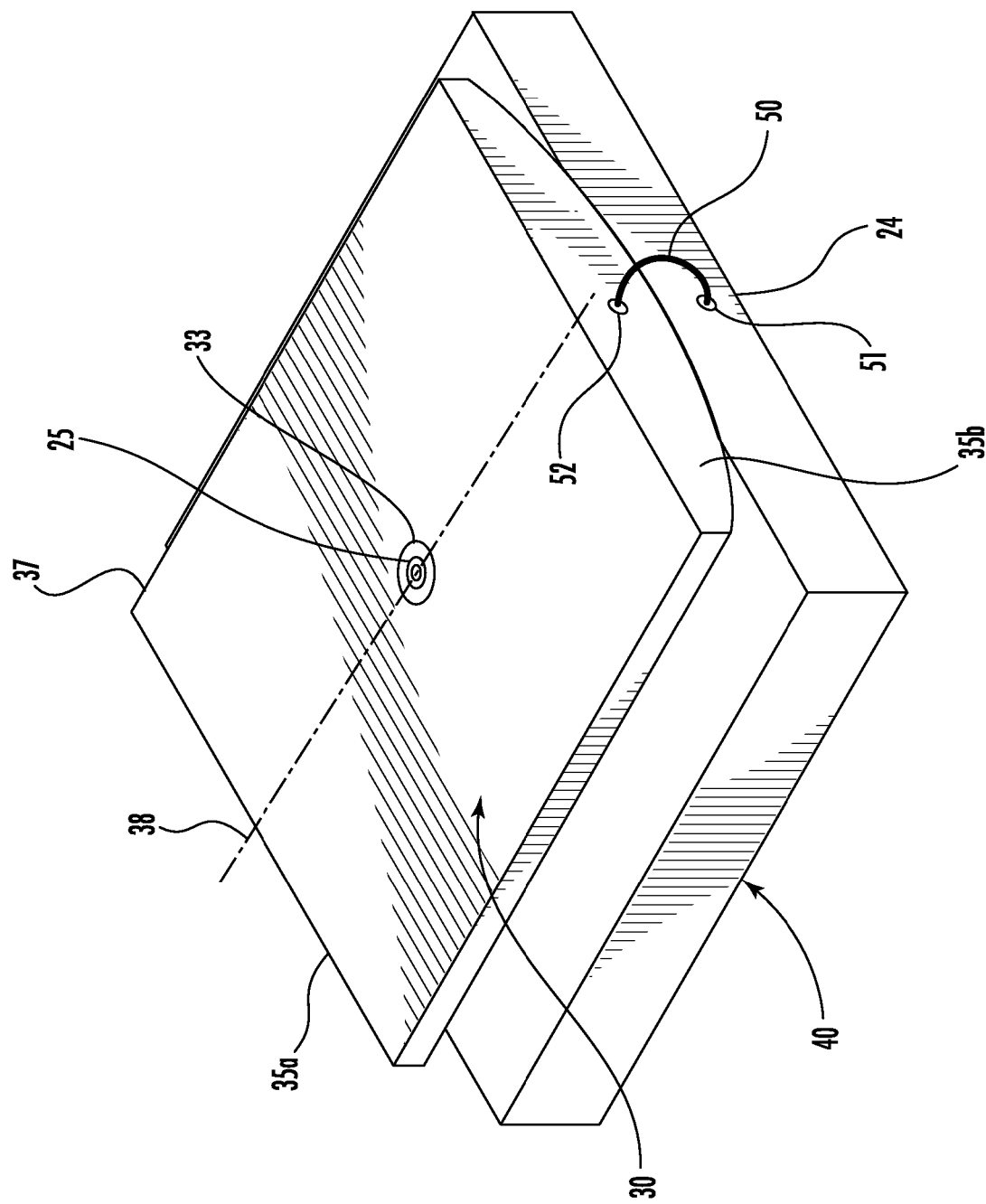
FIG. 3 is a rear perspective view of the embodiment of the self-leveling device in accordance with FIG. 1.
Figure 4:
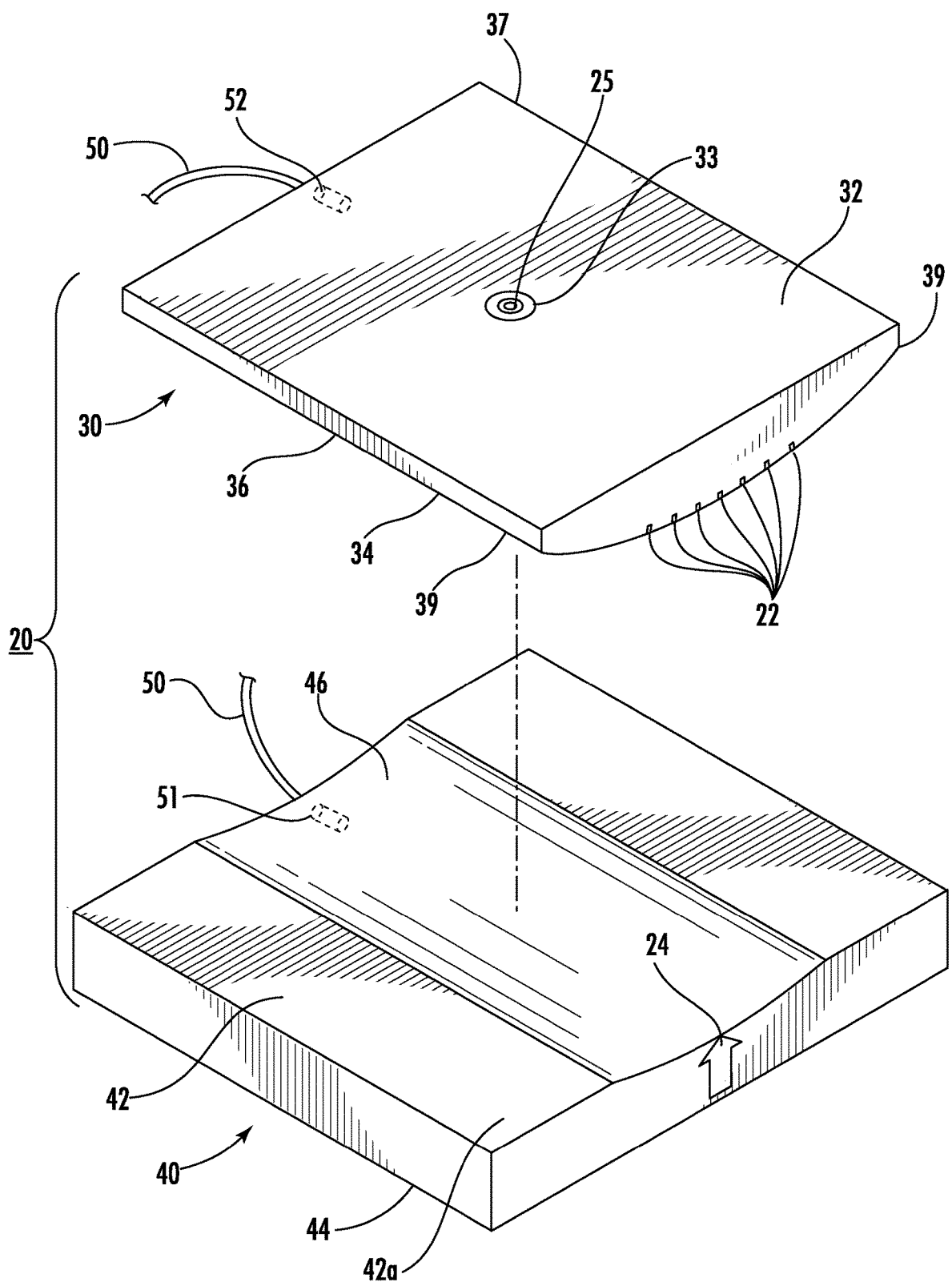
FIG. 4 is an exploded front perspective view of the embodiment of the self-leveling device in accordance with FIG. 1.
Figure 5:
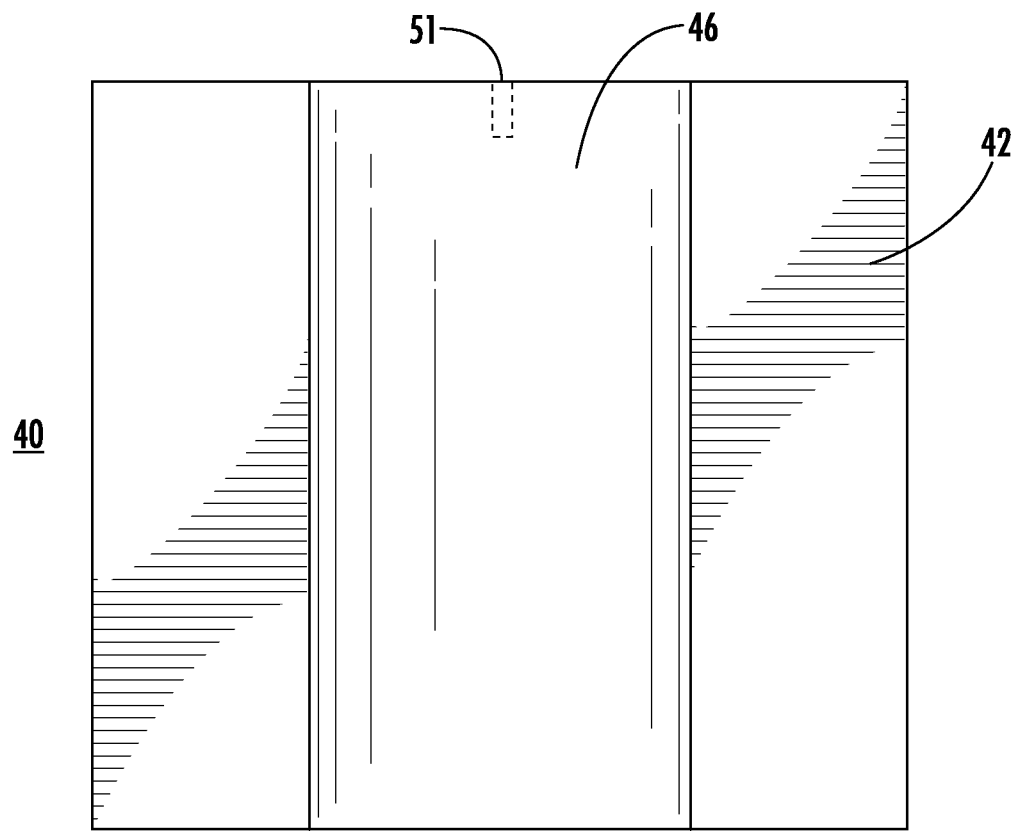
FIG. 5 is a top plan view of a bottom support in accordance with an embodiment of the present invention illustrated in FIG. 1.
Figure 6:
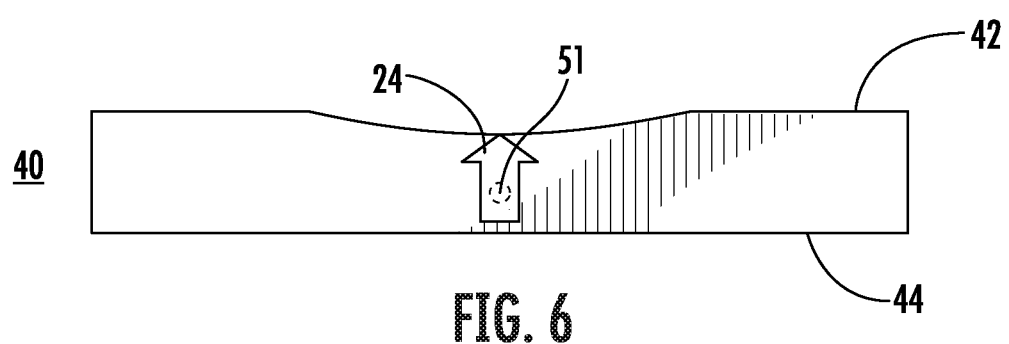
FIG. 6 is a front elevation of the bottom support in accordance with the embodiment of FIG. 5.
Figure 7:
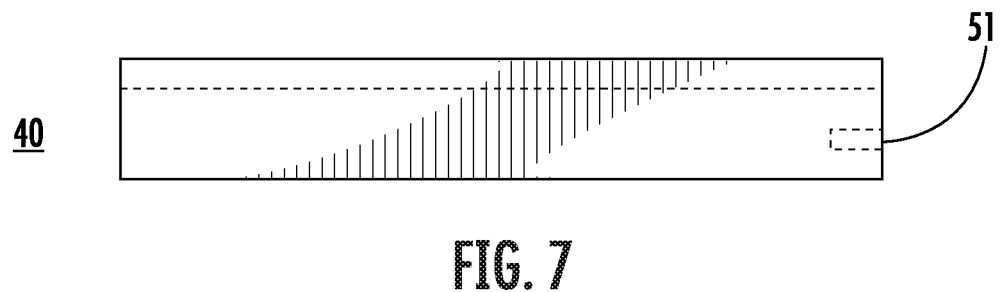
FIG. 7 is a side elevation of the bottom support in accordance with the embodiment of FIG. 5.
Figure 8:
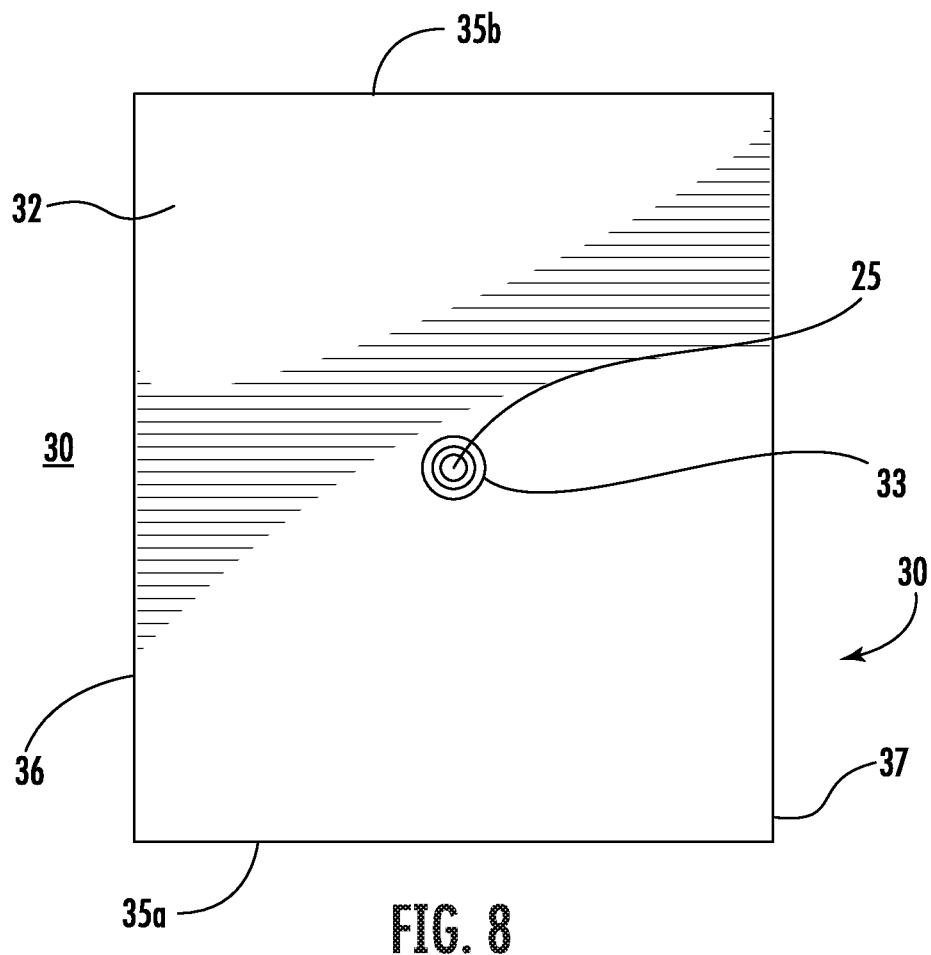
FIG. 8 is a top plan view of an arcuate support in accordance with an embodiment of the present invention illustrated in FIG. 1.
Figure 9:
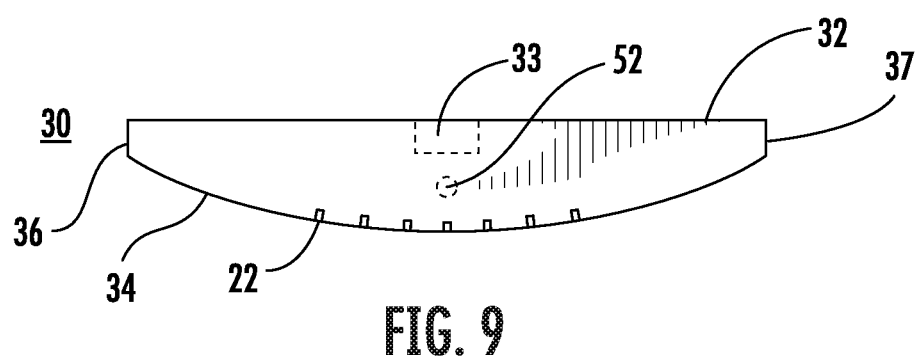
FIG. 9 is a front elevation of the arcuate support in accordance with the embodiment illustrated in FIG. 8.
Figure 10:
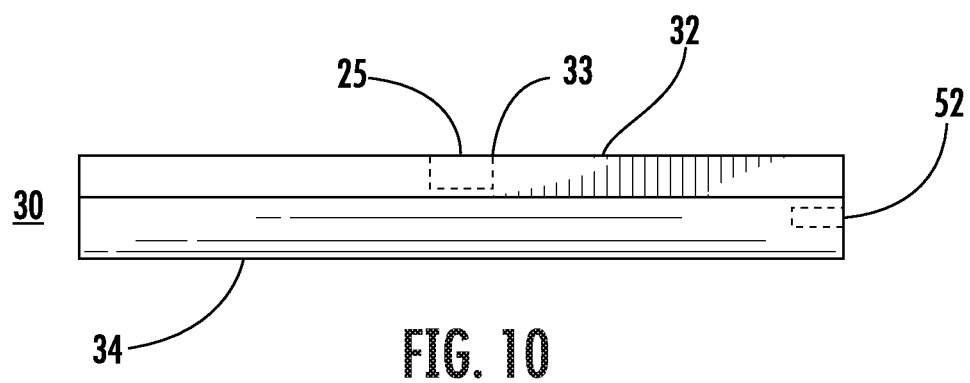
FIG. 10 is a side elevation of the arcuate support in accordance with the embodiment illustrated in FIG. 8.
Figure 11:
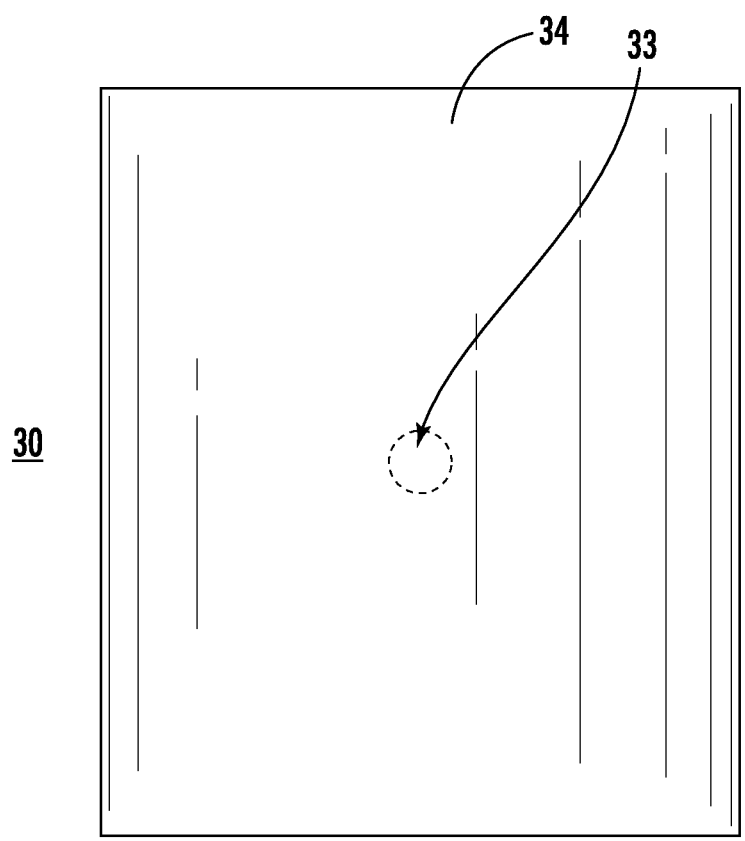
FIG. 11 is a bottom plan view of the arcuate support in accordance with the embodiment illustrated in FIG. 8.

As depicted in FIG. 2, an embodiment of the upper substantially planar surface 32 includes a cylindrical receiver 33, although other shapes may be utilized as desired, for securely receiving a level 25. The depicted embodiment of the cylindrical receiver 33 has sufficient depth and width for receiving the typical, bubble, bullseye or spirit-level 25. Generally, the level 25 provides the functionality or indication of the position, alignment and level status of the substantially planar surface 32. In the embodiment depicted in FIG. 2, the level 25 is illustrated as being centrally located along the substantially planar surface 32.

The upper arcuate support 30 depicted in FIGS. 2-3 and 8-11 includes a lower arcuate surface 34 with a circumference which extends between the substantially planar first and second sides 36, 37 although other configurations are within the scope of the present invention. The arcuate surface 34 generally presents a curved surface for rotation of the upper arcuate support 30 about the rotational axis 38. Angularly, the upper arcuate support 30 is generally rotateable between −45° and +45° from the horizontal orientation depicted in FIG. 2, but it may rotate more or less as desired. In general, the upper arcuate support 30 rotates between a normal or uncorrected horizontal orientation to a corrected or inclined orientation where the site level 25 indicates a neutral level position. In the inclined orientation the upper arcuate support 30 presents a generally horizontal receiving support for receiving a support 4 associated with the vertical support 7 of the vehicle 6.

An embodiment of the first and second sides 36, 37 are depicted in FIGS. 1-4. The first side 36 is spaced opposite the second side 37. Generally, the first and second sides 36, 37 are the same, each being substantially planar and extending between the substantially planar surface 32 and the arcuate surface 34. Each of the first and second sides 36, 37 presents an edge 39 where the first and second sides 36, 37 joins the arcuate surface 34. The edge 39 generally presents an obstacle to rotation of the upper arcuate support 30.

A plurality of indicia 22 are illustrated in FIG. 2 regularly spaced along the outer circumference of the arcuate support 30 generally along the front surface 35a. The indicia 22 may alternatively be located on the rear surface 35b or on both the front and rear surfaces 35a, 35b as desired. The indicia 22 are depicted as simple lines or indentations, but could be various shapes, sizes, colors and configurations and generally provide a visual representation for indicating a change in rotation of the arcuate support 30. The indicia 22 in combination with the guide 24 provide the alignment function to assist in aligning the upper arcuate support 30 in the proper orientation so that the upper arcuate support 30 presents a level surface as indicated by the site level 25. Generally, as the upper arcuate support 30 is rotated the indicia move to the left or the right while the guide 24, affixed to the lower support 40, remains stationary. In this way, the upper arcuate support 30 is properly aligned to provide a stable, horizontal surface without worry about variations in the underlying contoured surface.

An embodiment of the lower support 40 is illustrated in FIGS. 4-7 as a generally rectangular structure with a top 42 opposite a bottom 44. The bottom 44 may further include a frictionally coating applied to the bottom 44. The frictional coating generally provides additional frictional resistance to assist the bottom 44 to remain stationary as the weight of the RV 6 is lowered onto the vehicle leveling device 20 with a vertical support 7. The frictional coating (not shown) provides increased friction for gripping the underlying ground surface (not shown). Frictional coating provides a non-slip surface to prevent slippage between the lower support and the underlying surface such as gravel, grass or dirt. The frictional coating may be applied by applying an adhesive backed membrane or it may be brushed on or sprayed on to the bottom 44. The frictional coating may also seal any porous materials utilized by the lower support 40, also providing a moisture resistant barrier to protect the lower support 40 from ground moisture and improving the durability of the lower support 40. The frictional coating may be comprised of natural or synthetic materials which coats the bottom of the lower support 40 such as, but not limited to, rubber, silicon, latex or sand impregnated rubber, silicon or latex material.

An arcuate groove 46 is presented by a substantially planar top surface 42a, the arcuate groove 46 extending along the top 42. The arcuate groove 46 has a generally complementary arcuate shape corresponding to the arcuate surface 34 for rotation of the upper arcuate support 30 about the rotational axis 38. Because the illustrated embodiment of the arcuate surface 34 is convex, the arcuate groove 46 is concave. Alternatively, the arcuate surface 34 could be concave with the lower support 40 presenting a convex surface. Functionally, the lower support 40 supports the upper arcuate support 30 while allowing for desired rotation. The lower support 40 having sufficient height and width dimensions to support and level the load carried by the vehicle leveling device 20.

FIG. 12 reflects the left to right rotation of the upper arcuate support 30 upon the lower support 40. The guide 24 is illustrated on the front of the lower support 40 generally aligned with the center of the arcuate groove 46. The guide 24 functions as an indicator for use in measuring the slope of the vehicle leveling device 20 as the upper rotateable support 30 is rotated. In the depicted embodiment, the guide 24 is depicted as an arrow although other graphical representations may be used to provide an indication of the slope of the rotated structure. As the upper rotateable support 30 is rotated, the indicia 22 rotate according. Once the desired orientation of the upper rotateable support 30 is achieved the indicia 22 present a graphical representation of the change in position which may correspond to the angularity of the rotation. As the indicia 22 move to the left or right of the guide, the increased number of indicia 22 reflect a greater change in angular rotation from an unrotated position. On a level surface, the guide 24 is generally aligned in a neutral position towards the middle of the plural indicia 22. Depending on the contour of the underlying surface, the upper rotateable support 30 is rotated clockwise or counterclockwise until a substantially horizontal support is presented for receiving and supporting a vertical support structure 7 such as an RV stabilizer, jack or other support structure an embodiment of which is illustrated in FIG. 1.

As illustrated in FIG. 13, the vehicle leveling device 20 generally presents an angle of correction corresponding to the rotation of the arcuate support 30, also referred to herein as rotateable support. Generally, the greater the rotation of the upper arcuate support 30, the greater the angle of correction. The angle of correction generally indicates the angular rotation of the upper arcuate support 30 from a generally neutral alignment. The angle of correction corresponds to the rotation of the upper rotateable support 30 about the lower support 40 from the neutral position. The angle of correction indicates the magnitude of rotation of the upper arcuate support 30 required to present a level surface for the received support 4. The angle of correction is the angular separation of the intersection of the line which extends from the substantially planar support surface 32 when rotated with the line which extends from the substantially planar support surface 32 when positioned in the neutral orientation or uncorrected position. The angular separation of the two lines reflects the angle of correction as reflected in FIG. 13.

The corrected support surface corresponds to the substantially planar support surface 32 and generally presents a corrected horizontal support surface which takes into account the deviation of the underlying contour while presenting a generally aligned, level surface which is normal to the received RV 6 supporting structure. The generally horizontal corrected support surface is generally oriented at roughly (90°) ninety-degrees from the received RV 6 supporting structure. The weight of the received supporting structure also presents a downward directive force onto the rotateable support 30 such that the coefficient of friction of the weighted upper rotateable support 30 is sufficient to limit rotation of the upper rotateable support 30 during support of the received supporting structure by the lower support 40 and received within by the arcuate groove 46. Additional frictional resistance can be provided along the upper arcuate support or the lower support (or both) with, for example, the addition of frictional material which further increases the frictional resistance and thus decreasing the tendency for further rotation.

By way of example, the arcuate groove 46 presented by the lower support 40 may correspond to a circumference of a 5" radius which may provide for adjustment of the upper rotateable support 30 up to ±20° from the generally horizontal orientation. In this case, each indicia 22 may reflect approximately 5°, allowing the user to determine the angular rotation of the upper rotateable support 30 about the rotational axis 38 as measured from the guide 24 associated with the lower support 40.

A flexible member 50 extends between the upper rotateable support 30 and the lower support 40. Generally, the flexible member 50 provides the functionality of holding, moving the vehicle leveling device 20 and for retaining the upper rotateable support 30 with the lower support surface 40. The flexible member 50 generally extends singularly from a lower channel 51 associated with the lower support 40 and an upper channel 52 associated with the upper rotateable support 30. Alternatively, the flexible member 50 could be mechanically or chemically fastened using reliable fasteners or fabricated as multiple parts or embedded into the vehicle leveling device 20. The flexible member 50 could be a strap, cord, rope, chain, hose, belt or other similar devices.

The upper rotateable support 30 and the lower support surface 40 may be constructed of natural material such as wood or a synthetic material such as plastic or a composite material such as laminated veneer which can support a load of approximately 500 lbs. or more, resist degradation from UV and weather conditions and may also utilize a chemical adhesive such as an epoxy for securing the various components. In addition, the vehicle leveling device 20 may be painted with a water or oil-based coating such as paint or clear coat and may include a texture for added frictional resistance.

One of ordinary skill in the art will appreciate that the methods and system of the present invention are capable of being distributed in the form of a computer readable medium of instructions and a variety of forms and that the present invention applies equally regardless of the particular type of single bearing media actually used to carry-out the distribution.

The many features and advantages of the invention are apparent from the detailed specification, and thus, it is intended by the appended claims in any non-provisional application to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed and desired to be secured by Letters Patent:

1. A vehicle leveling device comprising:
   an upper arcuate support presenting a substantially planar surface;
   a lower support presenting an arcuate groove configured for rotation receipt of said upper arcuate support;
   a guide centrally aligned with said arcuate groove;
   a plurality of indicia extending circumferentially along said upper arcuate support in cooperation with said guide providing a rotational indication of said upper arcuate support; and
   a flexible member in communication with said upper arcuate support and said lower support.

2. A vehicle leveling device comprising:
   an upper arcuate support presenting a substantially planar surface;
   a lower support presenting an arcuate groove and configured for rotational receipt of said upper arcuate support;
   said upper arcuate support presenting an arcuate surface opposite said substantially planar surface;
   a rotational axis aligned with said arcuate groove and extending between a front and a rear associated with said upper arcuate support and parallel to said substantially planar surface; and
   said upper arcuate support configured for rotation about said rotational axis.

3. The vehicle leveling device according to claim 2 further comprising:
   a plurality of indicia extending circumferentially along said upper arcuate support; and
   a guide centrally aligned with said arcuate groove providing a rotational indication of said upper arcuate support.

4. The vehicle leveling device according to claim 2 further comprising a site level associated with said substantially planar surface wherein said site level indicates the angular position of said substantially planar surface.

5. The vehicle leveling device according to claim 2 further comprising a flexible member in communication with said upper arcuate support and said lower support.

6. The vehicle leveling device according to claim 2 further comprising a frictional coating.

7. A vehicle leveling device comprising:
   an upper arcuate support presenting a substantially planar surface and rotatable from a neutral orientation to a horizontal orientation;
   a lower support presenting an arcuate groove and configured for rotational receipt of said upper arcuate support;
   said upper arcuate support presenting an arcuate surface opposite said substantially planar surface and rotational about said arcuate groove; and
   an angle of correction extending from said upper arcuate support when rotated about said arcuate groove.

* * * * *